(12) United States Patent
Jin

(10) Patent No.: US 8,179,927 B2
(45) Date of Patent: May 15, 2012

(54) METHOD, SYSTEM AND GATEWAY FOR NEGOTIATING THE CAPABILITY OF DATA SIGNAL DETECTOR

(75) Inventor: Tong Jin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 211 days.

(21) Appl. No.: 12/412,212

(22) Filed: Mar. 26, 2009

(65) Prior Publication Data

US 2009/0201940 A1    Aug. 13, 2009

Related U.S. Application Data

(63) Continuation of application No. PCT/CN2007/002816, filed on Sep. 25, 2007.

(30) Foreign Application Priority Data

Sep. 29, 2006    (CN) .......................... 2006 1 0140659

(51) Int. Cl.
*H04J 3/12* (2006.01)
(52) U.S. Cl. ........................ 370/522; 358/402
(58) Field of Classification Search .................. 370/401, 370/522; 358/402
See application file for complete search history.

(56) References Cited

U.S. PATENT DOCUMENTS

| 6,628,429 | B1 |  | 9/2003 | Razazian |  |
|---|---|---|---|---|---|
| 7,623,550 | B2 | * | 11/2009 | Forbes | ........................... 370/477 |
| 2003/0193696 | A1 | * | 10/2003 | Walker et al. | ................. 358/402 |
| 2010/0260193 | A1 | * | 10/2010 | Ulybin | ......................... 370/401 |

FOREIGN PATENT DOCUMENTS

| CN | 1753366 |  | 3/2006 |
|---|---|---|---|
| CN | 1801773 | A | 7/2006 |
| CN | 101155095 | B | 9/2010 |
| EP | 0810804 | A2 | 12/1997 |
| EP | 1093310 | A2 | 4/2001 |
| JP | 11068794 |  | 3/1999 |

(Continued)

OTHER PUBLICATIONS

ITU-T G.729 Annex B: A seilence compression scheme for G.729 optimized for terminals conformiing to REcommendation V.70, Nov. 1996. pp. 1-2.*

(Continued)

*Primary Examiner* — Brian D Nguyen
*Assistant Examiner* — Siming Liu
(74) *Attorney, Agent, or Firm* — Brinks Hofer Gilson & Lione

(57) ABSTRACT

Methods and systems for negotiating the capability of a data signal detector include a sender gateway sending a first signaling containing data signal detector support capability message during voice band data transmission (301); a receiver gateway determining, according to the received first signaling, whether the sender gateway sends the data in a manner of containing a data signal detector, and determining whether to enable a non-voice decoder to decode mute packets (302). The sender gateway sends data in a manner of not containing a data signal detector according to the received second signaling (304). Embodiments of the present invention are applicable to a fax service in a packet-based network. Data signal detector capability negotiation may be implemented during voice band transmission. Embodiments of the present invention further disclose a sender gateway and a receiver gateway with ability for negotiating the capability of a data signal detector.

19 Claims, 4 Drawing Sheets

FOREIGN PATENT DOCUMENTS

JP        2005005825        1/2005

OTHER PUBLICATIONS

Written Opinion of the International Searching Authority issued in corresponding PCT Patent Application No. PCT/CN2007/002816, mailed Jan. 3, 2008.

Communication issued in corresponding European Patent Application No. 07816432.4, mailed Nov. 17, 2010.

Rapporteur Q11/16, "Proposed Draft New Corrigendum 2 to V.152 'Procedures for Supporting Voice-Band Data Over IP Networks'" International Telecommunication Union, Telecommunication Standardization Sector. Study Group 16—TD 131 (WP 1/16). Geneva, Apr. 3-13, 2006.

Nortel Multiservice Switch 7400, "Operation: Voice Transport", NN10600-750. XP 002607115.

Perkins et al., "RTP Payload for Redundant Audio Data", Network Working Group, Standards Track. Sep. 1997.

Handley et al., "SDP: Session Description Protocol", Network Working Group, Standards Track. Apr. 1998.

Rosenberg et al., "SIP: Session Initiation Protocol", Network Working Group, Standards Track. Jun. 2002.

Zopf, "Real-time Transport Protocol (RTP) Payload for Comfort Noise (CN)", Network Working Group, Standards Track. Sep. 2002.

Schulzrinne et al., "RTP Profile for Audio and Video Conferences with Minimal Control", Network Working Group, Standards Track. Jul. 2003.

Casner et al., "MIME Type Registration of RTP Payload Formats", Network Working Group, Standards Track. Jul. 2003.

Series H: Audiovisual and Multimedia Systems; Infrastructure of audiovisual services—Communication procedures, "Gateway control protocol: Version 3". ITU-T. H248.1, Sep. 2005.

Series V: Data Communication Over the Telephone Network; Interworking with other Networks, Procedures for Supporting Voice-band data over IP Networks. ITU-T. V152, Jan. 2005.

* cited by examiner

METHOD, SYSTEM AND GATEWAY FOR NEGOTIATING THE CAPABILITY OF DATA SIGNAL DETECTOR

CROSS REFERENCE TO RELATED APPLICATIONS

The present application is a continuation of International Patent Application Serial No. PCT/CN2007/002816, filed Sep. 25, 2007, which claims the benefit of Chinese Patent Application Serial No. 200610140659.2, filed Sep. 29, 2006, both of which are hereby incorporated by reference in their entireties.

FIELD OF THE INVENTION

The present invention relates to a method, system and gateway for negotiating the capability of a data signal detector, and more particularly, to a method and system for negotiating the capability of a data signal detector in a fax service transmitted using Voice-Band Data (VBD), and a sender gateway and a receiver gateway with ability of negotiating the capability of a data signal detector in a packet-based network.

BACKGROUND

I. Introduction of Implementation of Fax Services in a Packet-Based Network.

Information technologies will keep rapid development in the 21st century, and human beings have entered an age of network economy. With the rapid development of network technologies, transmission of multimedia using packet technologies becomes possible and even comes true. Because media stream coding manners are different in different communication networks, it is necessary to use a codec to convert the media stream coding manners at joints of different communication networks. A device which performs the conversion is called a "gateway".

Media streams now processed by the gateway mainly include voice streams, data streams, video streams, etc. The data streams mainly refer to signals transmitted by a data device such as a fax, a modem, or a text telephone during an interaction process. Currently, main manners for transferring data streams through a gateway in the industry include: VBD manner and Relay manner.

The VBD manner refers to a coding/decoding manner with less signal impairment, which treats data streams as normal voice streams and performs a low loss coding/decoding process. The proposed coding/decoding standards are ITU-T G.711 and ITU-T G.726. The advantage of VBD manner is that it is easy to implement and it does not need to be concerned about the concrete meaning of the data signals and the data signals simply need to be treated as voice signals. In this way, the VBD manner consumes very little of the processing capability of the gateway. The disadvantage of VBD manner is that this manner occupies a large amount of bandwidth, easily subjected to fluctuations of Internet Protocol (IP) networks, and vulnerable to packet loss and delay occurred in IP networks. The VBD manner may be applicable in processing data streams of various data devices.

The Relay manner refers to a manner that coverts by demodulation, according to some protocols that specify data signal conversion and transmission method, data signals sent by a sender data device, to data messages that are adapted to be transferred over an IP bearer network, transfers the data messages to a remote gateway, and then recovers by modulation, the data signals and sends the data signals to a receiver data device. Examples of Relay manners include Fax Relay in ITU-T T.38, Modem Relay in ITU-T V.150.1. The advantage of the Relay manner is that it is robust to various impairments that may occur in the IP network, and may considerably increase the possibility of success and stability of data services. The disadvantage of the Relay manner is that it is relatively complex and consumes a large amount of processing capability of the gateway.

With the constant development of data services, more and more types of data services appear. The VBD manner draws more and more attention due to its easy implementation and wide application. Further, some application optimizations have been done for VBD manner, such as to implement redundant process of Real-time Transport Protocol (RTP) messages according to the IETF RFC2198 protocol, to implement a static Jitter Buffer at a message receiver. The capability of resistance to packet loss and delay over IP networks of VBD manner is considerable enhanced.

However, the problem that VBD manner occupies a large amount of bandwidth is not solved well. Taking the coding/decoding manner specified by G.711 protocol as an example, the bandwidth occupied by data payload is 64 k bit/s when RFC2198 redundancy is not applied. The occupied bandwidth is 128 k bit/s when 1 frame is redundant. The occupied bandwidth is 192 k bit/s when 2 frames are redundant. Such requirement is not acceptable in some applications with limited bandwidth.

II. Introduction of Function of Data Signal Detector.

In conventional VBD manner, all of the data signals sent by a data device are treated as voice signals and are inputted into a voice encoder for a low loss coding/decoding process. FIG. 1 illustrates a conceptual diagram of a communication system in conventional VBD manner. As shown in FIG. 1, after data signals pass a voice encoder, a sender gateway sends the processed signals to a receiver gateway via a communication channel, and the receiver gateway outputs reconstructed data signals via a voice decoder.

However, in processes of many data services, it is very often that the data device only sends mute signals, not effective data signals. Taking the widely used fax machine, which supports a highest rate of 14400 bit/s as an example, its fax process is half duplex, that is, the fax machine sends mute signals in more than 50% of the time of the fax process.

In consideration of the above situation, it is proposed that a data signal detector be used in a system utilizing VBD manner, so that the effective data signals and mute signals sent by the data device may be distinguished and inputted into different encoders for coding. FIG. 2 illustrates a conceptual diagram of a communication system in a VBD manner using a data signal detector. The concept of the system is shown in FIG. 2.

The system includes three modules: a sender gateway, a communication channel, and a receiver gateway. The sender gateway includes a data signal detector, a low loss voice encoder and a non-voice encoder. The receiver gateway includes a voice decoder and a non-voice decoder. The communication channel is generally an IP network.

When data signals enter the sender gateway, the data signals are firstly divided into signal frames with equal intervals. The length of the frame is determined according to a coding protocol used by the encoder. Generally, the length is between 5-30 ms. Then the data signal detector analyzes each inputted signal frame and categorizes the frames into data signal frames and non-data signal frames based on whether the frame carries effective data signals or not. If the inputted signal frame is a data signal frame, the data signal detector controls the signal frame to enter the voice encoder for low loss voice coding; otherwise, the data signal detector controls the signal frame to enter the non-voice encoder for mute signal compression coding. Information outputted by the voice encoder is called a voice packet, while information outputted by the non-voice encoder is called a mute packet. Information in the mute packets is only used to restore mute signals. Therefore, the rate of mute packets is very low, less than 1/10 of the rate of voice packets.

When the receiver gateway receives the voice packets, the receiver gateway inputs the voice packets into a voice decoder for voice decoding and outputs the effective data signals. When the receiver gateway receives the mute packets, the receiver gateway inputs the mute packets into the non-voice decoder for reconstruction of the mute signals.

When using the data signal detector to categorize the signal frames into data signal frames and non-data signal (mute) frames, and handling these frames in different coding manners, only a little mute information is sent during a non-effective data signal period. Compared with the situation that all of the signal frames are inputted into the voice encoder without distinction, such a manner reduces an output code rate considerably.

III. Introduction of Control Protocol

The H.248 protocol is specified by International Telecommunications Union—Telecommunication Standardization Sector (ITU-T), and is specialized for media resource control. The H.248 protocol may be applied to control media processing devices such as media gateways, media servers. The basic concept of the H.248 protocol is that all of the resources on the media processing devices are abstracted as terminations which are further categorized into physical terminations and temporary terminations. The physical terminations represent some semi-permanent physical entities, such as Time Division Multiplex (TDM) timeslots. The temporary terminations represent public resources that are temporarily requested for use and released after usage, such as RTP streams. Combination of the terminations is abstracted as a context, which describes relationship between the terminations by topology. Based the abstracts, call connections are actually operations on the terminations and the context, and are accomplished by command requests and responses between media control devices and media processing devices. Commands include addition, modification, deletion, notification, etc. Command parameters are called descriptors, which are categorized into Property, Signal, Event and Statistic.

The Session Initiation Protocol (SIP) is specified by Internet Engineering Task Force (IETF), and is specialized for multimedia communication. According to the definition of the IETF RFC3261 protocol, SIP is a text based application layer control protocol, and is independent of an underlying layer transport protocol. SIP is adapted to establish, modify or terminate a two-party or multi-party multimedia session on an IP network. SIP protocol supports the functions such as proxy, redirection and user registration and location. By cooperating with associated protocols, SIP may also support functions such as voice, video, data, email, chat and game.

The Session Description Protocol (SDP) is specified by IETF, and is specialized for media stream information transmission in media sessions. SDP defines a uniform format of session description, including the following aspects:

1) name and object of a session;
2) life time of a session;
3) media information involved in a session, including: media type (such as video, voice etc.), transport protocol (such as RTP/UDP/IP, H.320 etc.), media format (such as H.263, G.711 etc.), address and port for multicast or far-end (unicast);

4) information needed for receiving the media (such as address, port, format etc.);
5) used bandwidth information; and
6) trusted Contact information.

Protocols such as SIP, H.248 all use SDP to describe properties of media resource.

Because the data signal detector is applied in a VBD mode, an extension of SDP during VBD capability negotiation in prior art is described below.

Under ITU-T V.152 protocol, when negotiating VBD capability, it is necessary to extent a "gpmd" (general-purpose media descriptor) property with a "vbd=yes" field, for example:

$m$=audio 3456 RTP/AVP 0 18 98

$a$=rtpmap:98 PCMA/8000

$a$=gpmd:98 vbd=yes

The 0, 18, 98 in the first line are payload types of RTP packets. According to IETF RFC3551 protocol, a payload type lower than 96 is a static payload type. The meaning of static payload type is fixed and is specified in RFC3551. A payload type between 96 and 127 is a dynamic payload type. The meaning of dynamic payload type is defined temporarily during usage. In the above embodiment, the first line means that the device supports three payload types 0, 18 and 98, where 0 represents G.711 μlaw, 18 represents G.729. The second line defines that a dynamic payload type 98 represents G.711 A law with a sample rate of 8000 Hz. The third line represents that the payload type 98 is applied to VBD manner, which implies that VBD is supported.

The deficiency of the prior art is that data signal detector capability negotiation cannot be implemented.

SUMMARY

Embodiments of the present invention provide a method and system for negotiating the capability of a data signal detector, and a sender gateway and a receiver gateway with ability of negotiating the capability of a data signal detector. Embodiments of the present invention aim to solving the problem that the packet network fax services in prior art do not have the ability of negotiating the capability of a data signal detector when using VBD transmission.

A method for negotiating the capability of a data signal detector according to an embodiment of the present invention includes:

sending, by a sender gateway, a first signaling containing a data signal detector support capability message during voice band data transmission; and determining, by a receiver gateway according to the received first signaling, whether the sender gateway sends the data in a manner of containing a data signal detector; if it is determined that the data is sent in a manner of containing a data signal detector, deciding to enable a non-voice decoder to decode mute packets; otherwise, if it is determined that the data is not sent in a manner of containing a data signal detector, deciding not to enable the non-voice decoder to decode mute packets.

Embodiments of the present invention further provide a system for negotiating the capability of a data signal detector, applicable to a fax service in a packet-based network, the system includes a sender gateway and a receiver gateway, the sender gateway includes a data signal detector, the receiver gateway includes a non-voice decoder, the system further includes a first sending device coupled to the sender gateway, and a first receiving device coupled to the receiver gateway, wherein:

the first sending device is configured to send a first signaling containing a data signal detector support capability message when the sender gateway transmits voice band data;

the first receiving device is configured to receive the first signaling; and the receiver gateway is configured to determine, according to the received first signaling, whether the sender gateway sends the data in a manner of containing the data signal detector; if it is determined that the data is sent in a manner of containing the data signal detector, the receiver gateway decides to enable a non-voice decoder to decode mute packets; if it is determined that the data is not sent in a manner of containing the data signal detector, the receiver gateway decides not to enable the non-voice decoder to decode mute packets.

Embodiment of the present invention further provide a method for negotiating the capability of a data signal detector, applicable to a data service in a packet network, the method includes the following steps:

sending, by a sender gateway, a first signaling containing a data signal detector support capability message during voice band data transmission; and determining, by a receiver gateway according to the received first signaling, whether the sender gateway sends the data in a manner of containing a data signal detector; if it is determined that the data is sent in a manner of containing a data signal detector, deciding to enable a non-voice decoder to decode mute packets; otherwise, if it is determined that the data is not sent in a manner of containing a data signal detector, deciding not to enable the non-voice decoder to decode mute packets.

Embodiments of the present invention further provide a sender gateway with ability of negotiating the capability of a data signal detector, applicable to a fax service in a packet network, the sender gateway includes a data signal detector, and further includes a first sending device configured to send a first signaling containing data signal detector support capability message during voice band data transmission of the sender gateway.

Embodiments of the present invention further provide a receiver gateway with ability for negotiating the capability of a data signal detector, applicable to a fax service in a packet network, the receiver gateway includes a non-voice decoder, and a first receiving device configured to receive a first signaling;

the receiver gateway determines, according to the first signaling received by the first receiving device, whether the sender gateway sends the data in a manner of containing a data signal detector; if it is determined that the data is sent in a manner of containing a data signal detector, the receiver gateway decides to enable a non-voice decoder to decode mute packets; otherwise, if it is determined that the data is not sent in a manner of containing a data signal detector, the receiver gateway decides not to enable the non-voice decoder to decode mute packets.

Benefits of embodiments of the present invention include the following:

Embodiments of the present invention solve the problem that the packet network fax services in prior art do not have data signal detector capability negotiation when using VBD transmission, and may perform data signal detector capability negotiation. The network devices support the data detector function, thus the network bandwidth occupied by the voice band data services is decreased, and the cost of the network is reduced.

DETAILED DESCRIPTION

Embodiments of the present invention are described below in conjunction with accompanying drawings.

Under ITU-T V.152 protocol, in a VBD mode transmission of the packet network fax service, when negotiating VBD capability, it needs to extent a "vbd=yes" field within a "gpmd" (general-purpose media descriptor) property of SDP. Embodiments of the present invention utilize the above provision, a signaling carries the "vbd=yes" field to send a message about data signal detector support capability set, so that a receiver gateway may adjust whether to enable the non-voice decoder to decode the mute packets according to the signaling.

In an implementation, by extending a signaling containing a "gpmd" property of SDP so as to include information for data signal detector capability negotiation, such as "dsd=yes", the signaling of embodiments of the present invention may be applied to a negotiation process of protocols such as the H.248, SIP and may implement data signal detector capability negotiation, wherein "dsd" (data signal detector) represents the data signal detector in embodiments of the present invention.

A signaling which includes information for data signal detector capability negotiation by extending a "gpmd" property of SDP with a "dsd=yes" field may be implemented as follows:

*m*=audio 3456 RTP/AVP 0 18 98 99

*a*=rtpmap:98 PCMA/8000

*a*=gpmd:98 vbd=yes

*a*=rtpmap:99 CN/8000

*a*=gpmd:99 dsd=yes

The first line in the above embodiment represents that the device supports four payload types 0, 18, 98 and 99, wherein 0 represents G.711 A law and 18 represents G.729. The second line defines that a dynamic payload type 98 represents G.711 A law with a sample rate of 8000 Hz. The third line represents that the payload type 98 is applied to VBD manner, which implies that VBD is supported. The fourth line defines that a dynamic payload type 99 represents Comfort Noise (CN, which is specified in IETF RFC3389) with a sample rate of 8000 Hz. The fifth line represents that the payload type 99 is applied to mute packet sent after a data signal detector detects mute signals, which implies that data signal detector capability is supported.

Figure 1:
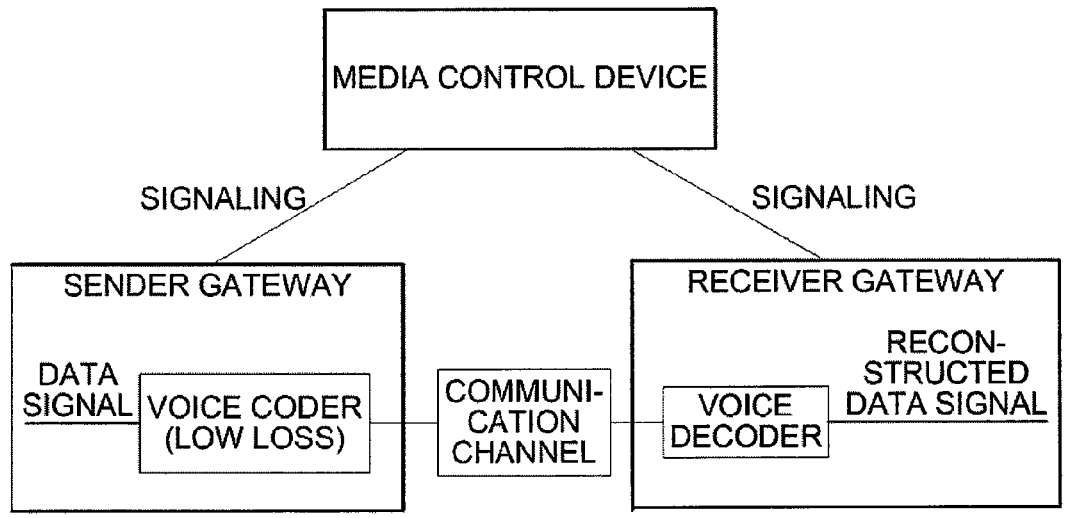
FIG. 1 illustrates a conceptual diagram of a conventional VBD manner communication system.
Figure 2:
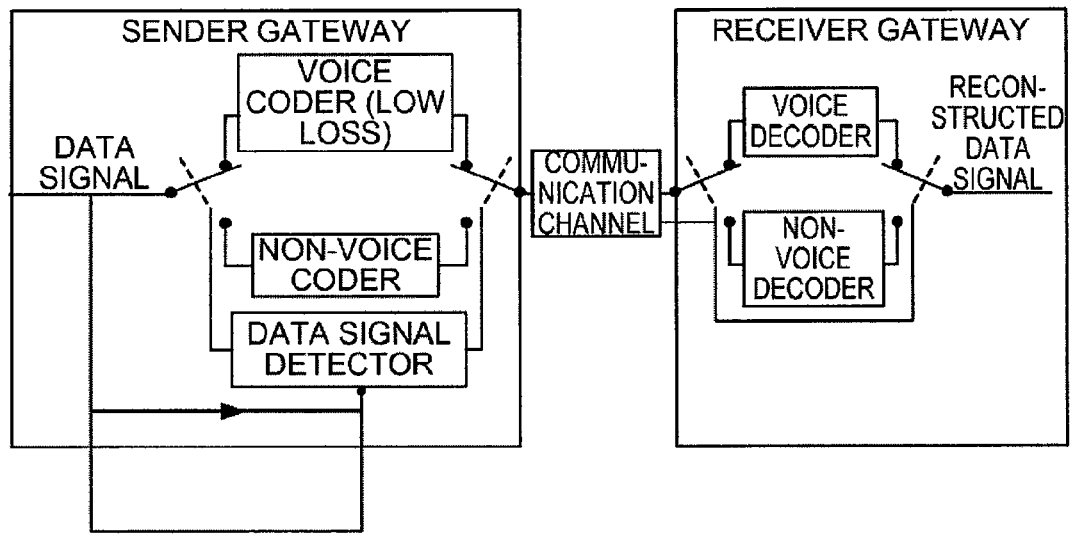
FIG. 2 illustrates a conceptual diagram of a VBD manner communication system with a data signal detector in prior art.
Figure 3:
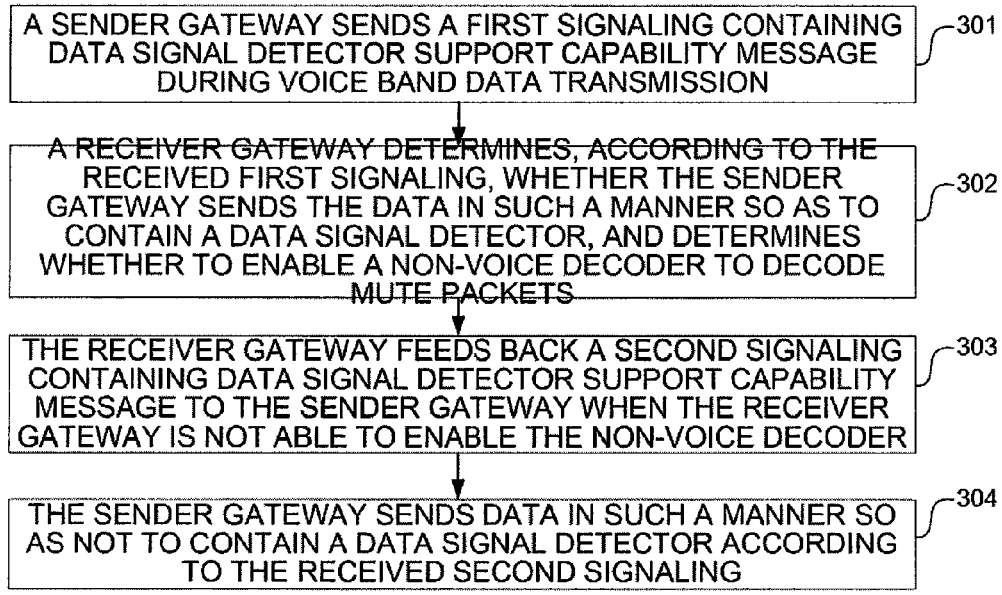
FIG. 3 illustrates a schematic diagram of a flowchart of a method for negotiating the capability of a data signal detector according to an embodiment of the present invention.

Embodiments of the present invention further provide a method for negotiating the capability of a data signal detector, FIG. 3 illustrates a schematic diagram of a flowchart of the method for negotiating the capability of a data signal detector according to an embodiment of the present invention. As shown in FIG. 3, when implemented, the method includes the following steps:

In Step 301, a sender gateway sends a first signaling containing data signal detector support capability message during voice band data transmission.

In Step 302, a receiver gateway determines, according to the received first signaling, whether the sender gateway sends the data in such a manner of containing a data signal detector, and determines whether to enable a non-voice decoder to decode mute packets.

In Step 303, the receiver gateway feeds back a second signaling containing data signal detector support capability message to the sender gateway when the receiver gateway is not able to enable the non-voice decoder.

In Step 304, the sender gateway sends data in such a manner of not containing a data signal detector according to the received second signaling.

When transferring in VBD manner, the used transfer control protocols are H.248 protocol or SIP protocol. The method and system for negotiating the capability of a data signal detector provided by embodiments of the present invention are the same under the concepts of sending and receiving the first signaling and the second signaling using the two protocols, so the two protocols may be implemented in a same manner in the method and system provided by embodiments of the present invention. Detailed embodiments of sending and receiving the first and second signaling will be uniformly described after the embodiments of the system.

Figure 4:
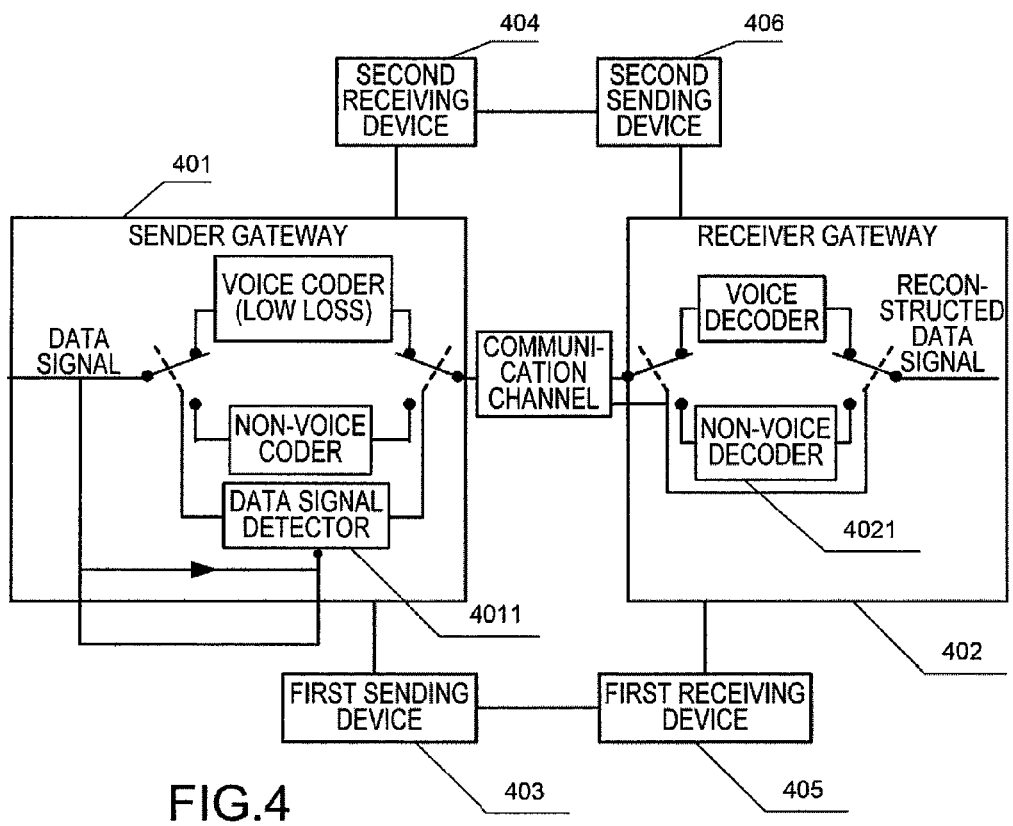
FIG. 4 illustrates a schematic diagram of a structure of a system for negotiating the capability of a data signal detector according to an embodiment of the present invention.

As a similar implementation to the above method, embodiments of the present invention further provide a system for negotiating the capability of a data signal detector, FIG. 4 illustrates a schematic diagram of a structure of a system for negotiating the capability of a data signal detector according to an embodiment of the present invention. As shown in FIG. 4, the system includes a sender gateway 401 and a receiver gateway 402, the position relationship and connections between the devices within the system are described below:

the sender gateway 401 includes a data signal detector 4011, a first sending device 403 and a second receiving device 404 which are coupled to the sender gateway respectively; and the receiver gateway 402 includes a non-voice decoder 4021, a first receiving device 405 and a second sending device 406 which are coupled to the sender gateway respectively.

In a detailed implementation, the first sending device 403 sends a first signaling containing data signal detector support capability message during voice band data transmission of the sender gateway 401. The first receiving device 405 receives the first signaling. The receiver gateway 402 determines, according to the first signaling received by the first receiving device 405, whether the sender gateway 401 sends the data in such a manner of containing a data signal detector 4011, and determines whether to enable the non-voice decoder 4021 to decode mute packets.

The second sending device 406 feeds back a second signaling containing data signal detector support capability message when the receiver gateway 406 is not able to enable the non-voice decoder 4021. The second receiving device 404 receives the second signaling The sender gateway 401 sends data, according to the received second signaling, in such a manner of not containing a data signal detector 4011.

When transferring in VBD manner, the used transfer control protocols are H. 248 protocol or SIP protocol, the details implementations using these two protocols are introduced below.

I. A Detailed Implementation for Negotiating the Capability of a Data Signal Detector Using H.248 Protocol.

A media control device and a media processing device interact via H.248 protocol. The descriptors LOCAL and REMOTE in H.248 protocol may be utilized to make a signaling contain information for data signal detector capability, that is, carry data signal detector capability described by extended SDP. When a signaling in SDP does not contain a data signal detector capability parameter, it means that the data signal detector function is not supported.

Figure 5:
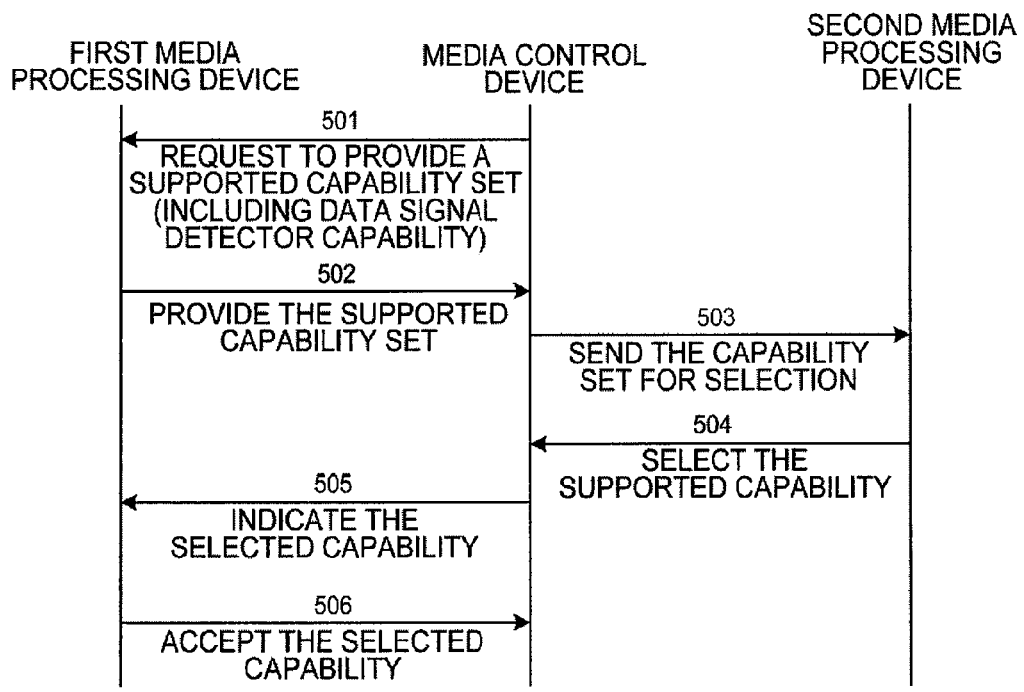
FIG. 5 illustrates a schematic diagram of a flowchart for negotiating the capability of a data signal detector using the H.248 protocol.

FIG. 5 illustrates a schematic diagram of a flowchart for negotiating the capability data signal detector using the H.248 protocol. As shown in FIG. 5, the flowchart includes the following steps:

In Step 501, a media control device requests a first media processing device to provide a supported capability set, including data signal detector capability.

In Step 502, the first media processing device provides the supported capability set to the media control device, including whether data signal detector capability is supported, the first media processing device returns the capability set to the media control device.

In Step 503, the media processing device sends the capability set provided by the first media processing device to a second media processing device, and requests the second media processing device to select the capabilities that are supported by itself.

In Step 504, the second media processing device selects the capabilities that are supported by itself, and returns the capabilities to the media control device.

In Step 505, the media processing device indicates the first media processing device to use the capabilities selected by the second media processing device.

In Step 506, the first media processing device accepts the selected capabilities.

Wherein, the first media processing device refers to the sender gateway, the second media processing device refers to the receiver gateway, the media processing device refers to devices that are specified to control the media processing devices.

Figure 6:
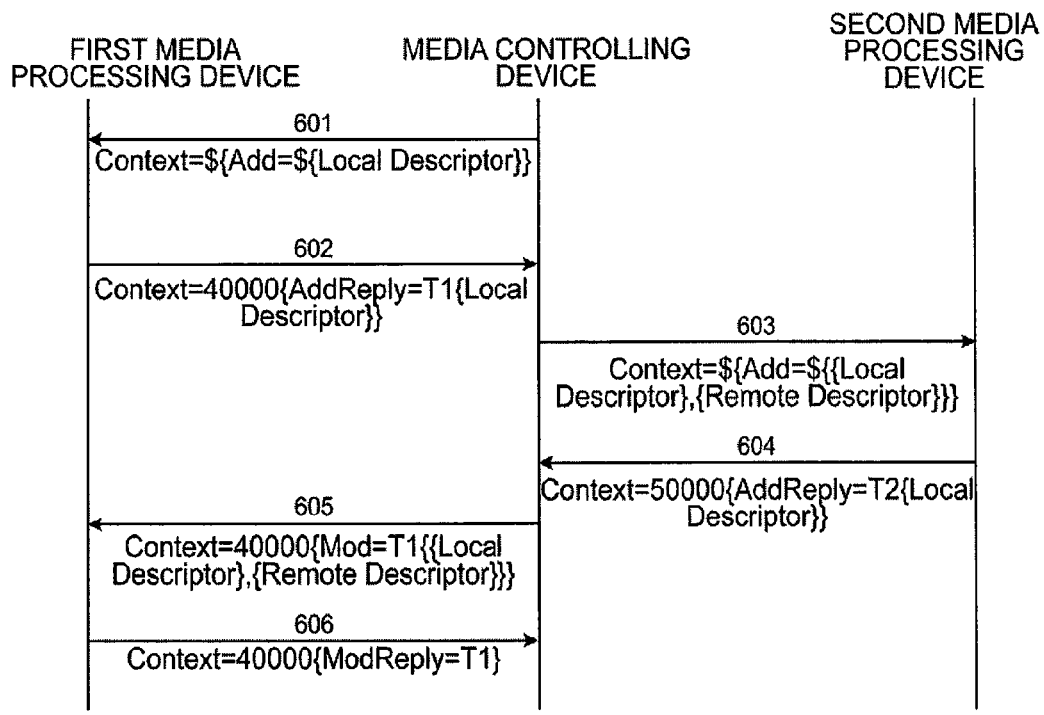
FIG. 6 illustrates a schematic diagram of message interaction for negotiating the capability of a data signal detector using the H.248 protocol.

FIG. 6 illustrates a schematic diagram of message interaction for negotiating the capability of a data signal detector using the H.248 protocol. A schematic process of message interaction in which data signal detector capability negotiation is contained in the sent signaling is shown in the figure. In a detailed implementation, messages are described by text coding/decoding, the message interaction, as shown by the figure, includes:

In Step 601, a media control device a first media processing device:

To add an IP termination, carry a multiplex parameter, valued $ in LOCAL descriptor, and request the first media processing device to return a capability set that is supported by itself in a response message.

```
MEGACO/1.0 [123.123.123.4]:55555
    Transaction = 11 {
        Context = $ {
            Add = $ {
                Media {
                    Stream = 1 {
                        LocalControl { Mode = ReceiveOnly,
                            ReserveGroup = True,
ReserveValue = True},
                        Local {
                            v=0
                            c=IN IP4 $
                            m=audio $ RTP/AVP 18 0 $
                        }
                    }
                }
            }
        }
    }
}
```

In Step 602, the first media processing device→the media control device:

The first media processing device carries the supported capability set in LOCAL descriptor, including voice coding capability under G.729 or G.711 μlaw, VBD capability, and capability of supporting data signal detector. The first media processing device returns the capability set to the media control device.

```
MEGACO/1.0 [124.124.124.5]:66666
    Transaction = 11 {
        Context = 40000 {
            Add = A4445 {
                Media {
                    Stream = 1 {
                        LocalControl { Mode = ReceiveOnly,
                            ReserveGroup = True,
ReserveValue = True},
                        Local {
                            v=0
                            c=IN IP4 124.124.124.111
                            m=audio 2222 RTP/AVP 18 0 98 99
                            a=rtpmap:98 PCMU/8000
                            a=gpmd:98 vbd=yes
                            a=rtpmap:99 CN/8000
                            a=gpmd:99 dsd=yes
                        }
                    }
                }
            }
        }
    }
}
```

In Step 603, the media control device→the second media processing device:

The media control device carries the capability set supported by the first media processing device in LOCAL and REMOTE descriptors, sends the capability set provided by the first media processing device to the second media processing device, and requests the second media processing device to select the capabilities that are supported by itself.

```
MEGACO/1.0 [123.123.123.4]:55555
    Transaction = 12 {
        Context = $ {
            Add = $ {
                Media {
                    Stream = 1 {
                        LocalControl { Mode = ReceiveOnly,
                            ReserveGroup = True,
ReserveValue = True},
                        Local {
                            v=0
                            c=IN IP4 $
                            m=audio $ RTP/AVP 18 0 $
                        }
                        Romote {
                            v=0
                            c=IN IP4 124.124.124.111
                            m=audio 1111 RTP/AVP 18 0 98 99
                            a=rtpmap:98 PCMU/8000
                            a=gpmd:98 vbd=yes
                            a=rtpmap:99 CN/8000
                            a=gpmd:99 dsd=yes
                        }
                    }
                }
            }
        }
    }
}
```

In Step 604, the second media processing device→the media processing device:

The second processing device carries the selected capability in LOCAL descriptor, including voice coding capability in G.729, VBD capability and data signal detector capability. The second media processing device returns the capability set to the media control device.

```
MEGACO/1.0 [125.125.125.6]:77777
    Transaction = 12 {
        Context = 50000 {
            Add = A5556 {
                Media {
                    Stream = 1 {
LocalControl { Mode = ReceiveOnly, ReserveGroup = True,
ReserveValue = True},
Local {
                            v=0
                            c=IN IP4 125.125.125.222
                            m=audio 2222 RTP/AVP 18 98 99
                            a=rtpmap:98 PCMU/8000
                            a=gpmd:98 vbd=yes
                            a=rtpmap:99 CN/8000
                            a=gpmd:99 dsd=yes
                        }
                    }
                }
            }
        }
    }
}
```

In Step 605, the media control device→the first media processing device:

The media processing device indicates the first media processing device to use the capabilities selected by the second media processing device, and carries the selected capability in LOCAL and REMOTE descriptors of the sent message.

```
MEGACO/1.0 [123.123.123.4]:55555
    Transaction = 13 {
        Context = 40000 {
```

```
            Modify = A4445 {
                Media {
                    Stream = 1 {
  LocalControl { Mode = ReceiveOnly, ReserveGroup = True,
  ReserveValue = True},
  Local {
                        v=0
                        c=IN IP4 124.124.124.111
                        m=audio 1111 RTP/AVP 18 98 99
                        a=rtpmap:98 PCMU/8000
                        a=gpmd:98 vbd=yes
                        a=rtpmap:99 CN/8000
                        a=gpmd:99 dsd=yes
                    }
                    Remote {
                        v=0
                        c=IN IP4 125.125.125.222
                        m=audio 2222 RTP/AVP 18 98 99
                        a=rtpmap:98 PCMU/8000
                        a=gpmd:98 vbd=yes
                        a=rtpmap:99 CN/8000
                        a=gpmd:99 dsd=yes
                    }
                }
            }
        }
    }
}
```

In Step 606, the first media processing device→the media control device:

The first media processing device accepts the selected capabilities, and returns a response message of successful modification.

```
            MEGACO/1 [124.124.124.555]:66666
            Reply = 13 {
                Context = 40000 {Modify = A4445}
            }
```

II. A Detailed Implementation for Negotiating the Capability of a Data Signal Detector Using SIP Protocol.

The SIP protocol uses SDP protocol to describe media parameters, and a signaling may use a SDP extension containing data signal detector capability information described above to support data signal detector capability negotiations.

1. The SIP message request end sends a request message, carrying a capability set that is supported by itself, and the capability set may include voice coding capability, VBD capability, and data signal detector capability.

2. SIP message answer end makes a selection within the received multiplex capability set, returns a response message to the request end, carrying selected voice coding capability, VBD capability, and data signal detector capability. If the SIP message answer end does not support data signal detector capability, a SDP description line carrying data signal detector capability is deleted from the response message.

A detail embodiment of a successful negotiation is shown below: a SIP message request end that is contained by a signaling supports voice coding capability in G.729 or G.711 µlaw, VBD capability and data signal detector capability. A SIP message answer end determines to support voice coding capability in G.729, VBD capability and data signal detector capability.

SIP Request:

*m*=audio 12345 RTP/AVP 18 0 98 99

*a*=rtpmap:98 PCMU/8000

*a*=gpmd:98 vbd=yes

*a*=rtpmap:99 CN/8000

*a*=gpmd:99 dsd=yes

SIP Response:

*m*=audio 23456 RTP/AVP 18 98 99

*a*=rtpmap:98 PCMU/8000

*a*=gpmd:98 vbd=yes

*a*=rtpmap:99 CN/8000

*a*=gpmd:99 dsd=yes

A detail embodiment of a failed negotiation is shown below: a SIP message request end that is contained by a signaling supports voice coding capability in G.729 or G.711 µlaw, VBD capability and data signal detector capability. A SIP message answer end determines to support voice coding capability in G.729, VBD capability, but does not support data signal detector capability.

SIP Request:

*m*=audio 12345 RTP/AVP 18 0 98 99

*a*=rtpmap:98 PCMU/8000

*a*=gpmd:98 vbd=yes

*a*=rtpmap:99 CN/8000

*a*=gpmd:99 dsd=yes

SIP Response:

*m*=audio 23456 RTP/AVP 18 98 99

*a*=rtpmap: 98 PCMU/8000

*a*=gpmd: 98 vbd=yes

Based on a same concept, a message that is contained in a signaling may also implemented as follows when data signal detector function is not supported:

When the media processing device does not support data signal detector function, expect for deleting relative descriptions of data signal detector capability from SDP, a "dsd=no" field may be added in "gpmd" property in SDP of the response message. In an implementation, it can be represented as follows:

*m*=audio 3456 RTP/AVP 18 98 99

*a*=rtpmap: 98 PCMA/8000

*a*=gpmd: 98 vbd=yes

*a*=rtpmap: 99 CN/8000

*a*=gpmd: 99 dsd=no

In an implementation, a signal may also use combination information of existent SDP properties, for example:

To use a combination of "CN/8000" field and "vbd=yes" field in SDP property to negotiate data signal detector capability, and apply it into a negotiation process tinder protocols such as the H.248 protocol or the SIP protocol. For example:

*m*=audio 3456 RTP/AVP 18 98 99

*a*=rtpmap: 98 PCMA/8000 a=gpmd: 98 vbd=yes a=rtpmap: 99 CN/8000 a=gpmd: 99 vbd=yes

Accordingly, when the media processing device does not support data signal detector capability, except for deleting relative descriptions of data signal detector capability from SDP, a combination of "CN/8000" field and "vbd=no" field in SDP property may be used in the response message. For example:

m=audio 3456 RTP/AVP 18 98 99 a=rtpmap: 98 PCMA/8000 a=gpmd: 98 vbd=yes a=rtpmap: 99 CN/8000 a=gpmd: 99 vbd=no

Figure 7:
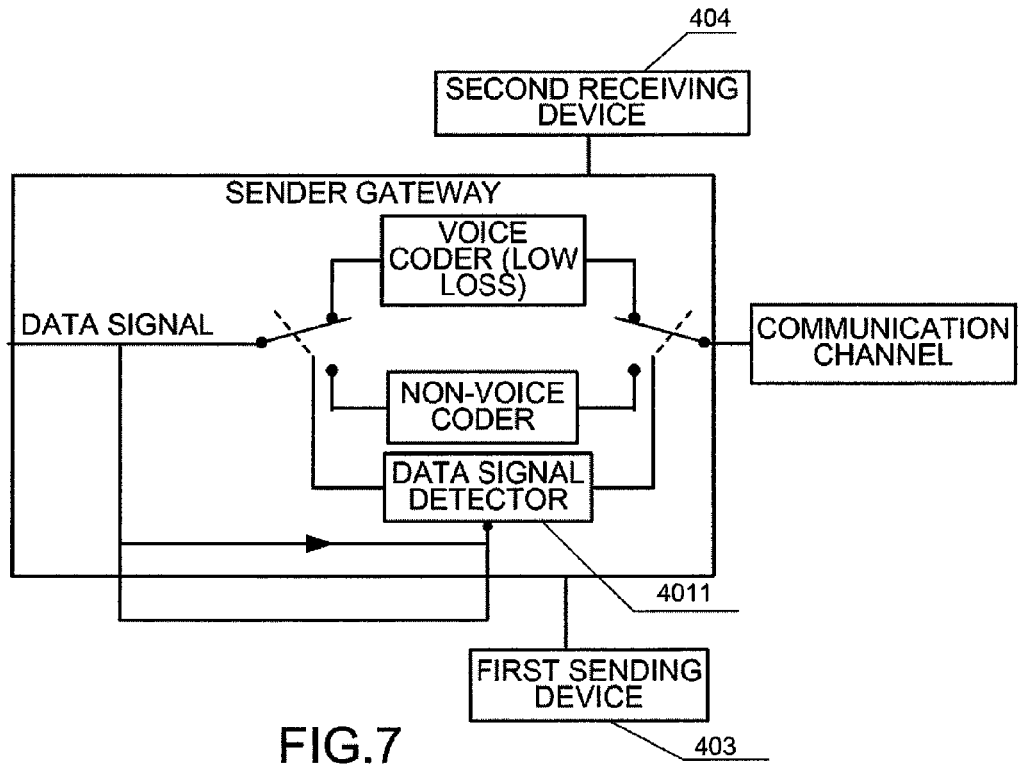
FIG. 7 illustrates a schematic diagram of a structure of a sender gateway with ability for negotiating the capability of a data signal detector according to an embodiment of the present invention.

Embodiments of the present invention further provide a sender gateway with ability for negotiating the capability of a data signal detector, applied for packet network fax services. FIG. 7 illustrates a schematic diagram of a structure of a sender gateway with ability for negotiating the capability of a data signal detector according to an embodiment. As shown in FIG. 7, the sender gateway includes a data signal detector 4011, a first sending device 403 configured to send a first signaling containing data signal detector support capability message during voice band data transmission of the sender gateway.

The sender gateway further includes a second receiving device 404 configured to feed back a second signaling containing data signal detector support capability message to the sender gateway when the receiver gateway determines to enable the non-voice decoder to decode the mute packets but the receiver gateway is not able to enable the non-voice decoder.

Figure 8:
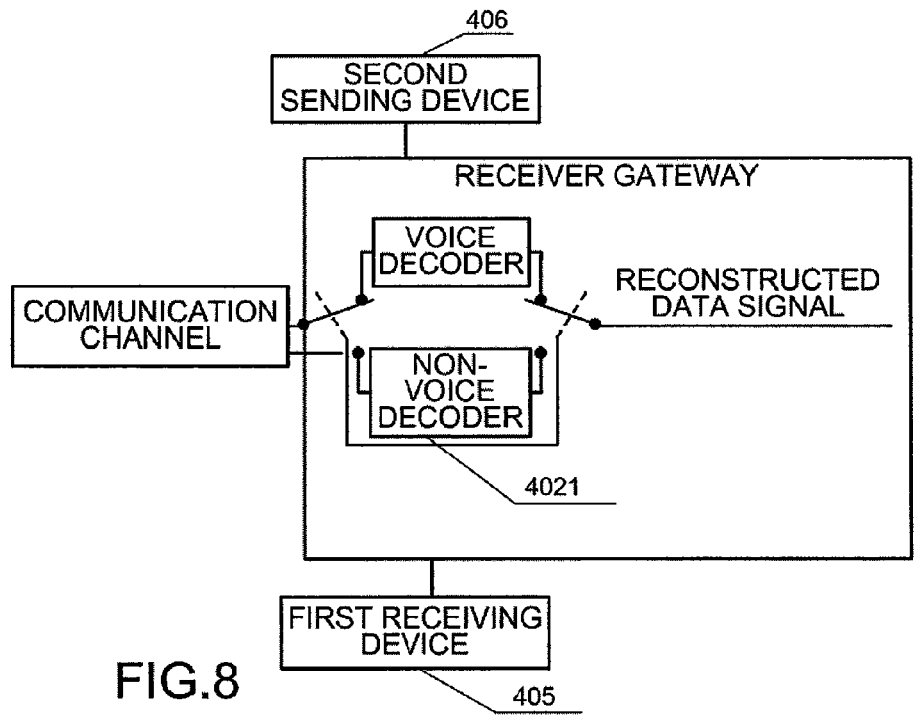
FIG. 8 illustrates a schematic diagram of a structure of a receiver gateway with ability for negotiating the capability of a data signal detector according to an embodiment of the present invention.

Embodiments of the present invention further provide a receiver gateway with ability for negotiating the capability of a data signal detector, applied for packet network fax services. FIG. 8 illustrates a schematic diagram of a structure of a receiver gateway with ability for negotiating the capability of a data signal detector according to an embodiment. As shown in FIG. 8, the receiver gateway includes a non-voice decoder 4021, and a first receiving device 405 configured to receive a first signaling.

The receiver gateway determines, according to the first signaling received by the first receiving device 405, whether the sender gateway sends the data in such a manner of containing a data signal detector; if it is determined that the data is sent in such a manner of containing a data signal detector, the sender gateway decides to enable a non-voice decoder to decode mute packets; otherwise, if it is determined that the data is not sent in such a manner of containing a data signal detector, the sender gateway decides not to enable the non-voice decoder to decode mute packets.

The receiver gateway further includes a second receiving device 406 configured to feed back a second signaling containing data signal detector support capability message to the sender gateway when the receiver gateway determines to enable the non-voice decoder to decode the mute packets but the receiver gateway is not able to enable the non-voice decoder.

It is obvious that when the other data services sent by data devices such as digital modems, text telephones in a data stream have a similar work concept with the fax service, one of the ordinary skilled in the art may make various variations or modifications to the embodiments of the present invention as to apply the present invention to data services, without go beyond spirit and range of the present invention. These variations or equivalents shall be construed as fall within the scope of the present invention. Therefore, the scope of the present invention should be determined by the scope of the claims.

What is claimed is:

1. A method for negotiating the capability of a data signal detector (dsd) at a sender gateway, applicable to a fax service in a packet-based network, comprising:
  sending, by the sender gateway, a first signaling containing a message indicating the capability of the data signal detector during voice band data transmission; and
  determining, by a receiver gateway, according to a dsd field in the received first signaling, whether the sender gateway sends data in a manner of being processed by the data signal detector; if it is determined that the data is sent in a manner of being processed by the data signal detector, determining to enable a non-voice decoder to decode mute packets; otherwise, it is determined that the data is not sent in a manner of being processed by the data signal detector, determining not to enable the non-voice decoder to decode mute packets, wherein the mute packets includes information outputted by a non-voice encoder and the data excludes the voice data.

2. The method of claim 1, wherein, determining to enable the non-voice decoder to decode mute packets if it is determined that the data is sent in a manner of being processed by the data signal detector further comprises:
  feeding back, by the receiver gateway, a second signaling containing a data signal detector support capability message to the sender gateway when the receiver gateway is not able to enable the non-voice decoder; and
  sending, by the sender gateway, data in a manner of not being processed by the data signal detector according to the received second signaling.

3. The method of claim 2, wherein, the sender gateway and the receiver gateway perform data signal detector capability negotiation using the H.248 protocol, the receiver gateway feeds back the second signaling via a second media processing device and a media control device, the sender gateway receives the second signaling via the media control device and a first media processing device.

4. The method of claim 2, wherein, the sender gateway and the receiver gateway perform data signal detector capability negotiation using the Session Initiation Protocol, the receiver gateway sends the second signaling via an end for requesting an Session Initiation Protocol message, the sender gateway receives the second signaling via an end for answering the Session Initiation Protocol message.

5. The method of claim 1, wherein, the sender gateway and the receiver gateway perform data signal detector capability negotiation using the H.248 protocol, the sender gateway sends the first signaling via a first media processing device and a media control device, the receiver gateway receives the first signaling via the media control device and a second media processing device.

6. The method of claim 1, wherein, the sender gateway and the receiver gateway perform data signal detector capability negotiation using the Session Initiation Protocol, the sender gateway sends the first signaling via an end for request an Session Initiation Protocol message, the receiver gateway receives the first signaling via an end for answering the Session Initiation Protocol message.

7. The method of claim 1, wherein, the first signaling is sent using Session Description Protocol when negotiating voice band data signal detector capability using ITU-T V.152 protocol.

8. The method of claim 7, wherein, the first signaling is sent after the first signaling carries "general-purpose media descriptor (gpmd)" property information of the Session Description Protocol.

9. The method of claim 2, wherein, the second signaling is sent using Session Description Protocol when negotiating voice band data signal detector capability using ITU-T V.152 protocol.

10. The method of claim 9, wherein, the second signaling is sent after the second signaling carries "general-purpose media descriptor (gpmd)" property information of the Session Description Protocol.

11. A system for negotiating the capability of a data signal detector (dsd), applicable to a fax service in a packet-based network, comprising a sender gateway and a receiver gateway, the sender gateway comprising a data signal detector, the receiver gateway comprising a non-voice decoder, wherein, the system further comprises a first sending device coupled to the sender gateway, and a first receiving device coupled to the receiver gateway, wherein:
the first sending device is configured to send a first signaling containing a message indicating the capability of the data signal detector when the sender gateway transmits voice band data;
the first receiving device is configured to receive the first signaling; and
the receiver gateway is configured to determine, according to the received first signaling, whether the sender gateway sends data in a manner of being processed by the data signal detector; if it is determined that the data is sent in a manner of being processed by the data signal detector, the receiver gateway determines to enable a non-voice decoder to decode mute packets; otherwise, if it is determined that the data is not sent in a manner of being processed by the data signal detector, the receiver gateway determines not to enable the non-voice decoder to decode mute packets, wherein the mute packets includes information outputted by a non-voice encoder and the data excludes the voice data.

12. The system of claim 11, wherein, the system further comprises a second sending device coupled to the receiver gateway, and a second receiving device coupled to the sender gateway, wherein
the second sending device is configured to feed back a second signaling containing a data signal detector support capability message to the sender gateway when the receiver gateway determines to enable the non-voice decoder to decode the mute packets but the receiver gateway is not able to enable the non-voice decoder;
the second receiving device is configured to receive the second signaling; and
the sender gateway is configured to send data, according to the received second signaling received by the second receiving device, in a manner of not being processed by the data signal detector.

13. The system of claim 12, wherein, when the sender gateway and the receiver gateway perform data signal detector capability negotiation using the H.248 protocol, the second sending device and the second receiving device send and receive the second signaling via a media processing device and a media control device.

14. The system of claim 12, wherein, when the sender gateway and the receiver gateway perform data signal detector capability negotiation using Session Initiation Protocol, the second sending device sends the second signaling via an end for requesting an Session Initiation Protocol message, the second receiver device receives the second signaling via an end for answering an Session Initiation Protocol message.

15. The system of claim 11, wherein, when the sender gateway and the receiver gateway perform data signal detector capability negotiation using the H.248 protocol, the first sending device and the first receiving device send and receive the first signaling via a media processing device and a media control device.

16. The system of claim 11, wherein, when the sender gateway and the receiver gateway perform data signal detector capability negotiation using the Session Initiation Protocol, the first sending device sends the first signaling via an end for requesting an Session Initiation Protocol message, the first receiver device receives the first signaling via an end for answering the Session Initiation Protocol message.

17. A receiver gateway for negotiating the capability of a data signal detector (dsd) at a sender gateway, applicable to a fax service in a packet-based network, comprising a non-voice decoder, wherein, the receiver gateway further comprise a first receiving device configured to receiver a first signaling;
the receiver gateway determines, according to the first signaling received by the first receiving device, whether the sender gateway sends data in a manner of being processed by the data signal detector; if it is determined that the data is sent in a manner of being processed by the data signal detector, the receiver gateway determines to enable a non-voice decoder to decode mute packets; if it is determined that the data is not sent in a manner of being processed by the data signal detector, the receiver gateway determines not to enable the non-voice decoder to decode mute packets, wherein the mute packets includes information outputted by a non-voice encoder and the data excludes the voice data.

18. The system of claim 17, wherein, the receiver gateway further comprises:
a second receiving device, configured to feed back a second signaling containing a data signal detector support capability message to the sender gateway when the receiver gateway determines to enable the non-voice decoder to decode the mute packets but the receiver gateway is not able to enable the non-voice decoder.

19. A method for negotiating the capability of a data signal detector at a sender gateway, applicable to a data service in a packet-based network, comprising:
sending, by the sender gateway, a first signaling containing a message indicating the capability of the data signal detector during voice band data transmission; and
determining, by a receiver gateway according to the received first signaling, whether the sender gateway sends data in a manner of being processed by the data signal detector; if it is determined that the data is sent in a manner of being processed by the data signal detector, determining to enable a non-voice decoder to decode mute packets; otherwise, if it is determined that the data is not sent in a manner of being processed by the data signal detector, determining not to enable the non-voice decoder to decode mute packets, wherein the mute packets includes information outputted by a non-voice encoder and the data excludes the voice data.

* * * * *